US007660269B2

(12) United States Patent
Aoki et al.

(10) Patent No.: US 7,660,269 B2
(45) Date of Patent: Feb. 9, 2010

(54) APPARATUS, METHOD, AND PROGRAM FOR CREATING NETWORK CONFIGURATION INFORMATION

(75) Inventors: Kentaro Aoki, Sagamihara (JP); Takeshi Ohmori, Yokohama (JP); Kunio Okuda, Sagamihara (JP); Yukinobu Moriya, Tokyo (JP); Hideo Yasuniwa, Machida (JP)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/315,048

(22) Filed: Dec. 22, 2005

(65) Prior Publication Data

US 2006/0153246 A1    Jul. 13, 2006

(30) Foreign Application Priority Data

Dec. 28, 2004 (JP) ............................... 2004-380078

(51) Int. Cl.
*H04L 12/28* (2006.01)
(52) U.S. Cl. ..................... 370/255; 370/396; 370/400; 709/224
(58) Field of Classification Search ................ 370/241, 370/254, 255, 396, 400, 474; 709/223, 224, 709/232
See application file for complete search history.

(56) References Cited

U.S. PATENT DOCUMENTS 6,137,782 A * 10/2000 Sharon et al. ............... 370/255
6,396,810 B1 * 5/2002 Hebel ......................... 370/248
6,618,755 B1 * 9/2003 Bonn .......................... 709/223
6,735,548 B1 * 5/2004 Huang et al. ................ 702/179
6,847,614 B2 * 1/2005 Banker et al. ............... 370/252
6,928,059 B1 * 8/2005 Valentine et al. ............ 370/255
7,103,679 B2 * 9/2006 Bonn .......................... 709/245
7,143,283 B1 * 11/2006 Chen et al. .................. 713/153
7,221,646 B2 * 5/2007 Kawano et al. ............. 370/218
7,450,524 B2 * 11/2008 Hennessey et al. .......... 370/254
7,480,707 B2 * 1/2009 Morlitz ....................... 709/223
2002/0105911 A1 * 8/2002 Pruthi et al. ................. 370/241
2005/0018694 A1 * 1/2005 Mitani et al. ................ 370/396

FOREIGN PATENT DOCUMENTS

JP          11-243390 A1    9/1999
JP       2004-207816 A1    7/2000

* cited by examiner

*Primary Examiner*—Dang T Ton
*Assistant Examiner*—Brian O'Connor
(74) *Attorney, Agent, or Firm*—Andrea Bauer; Shimokaji & Associates PC

(57) ABSTRACT

An apparatus for creating network configuration information from data including packet transmission time between one or more relay devices and a terminal, the relay devices relaying a signal which runs through a network and is measured by the terminal connected to the network, to another network, information about the relay devices and information about the terminal. The apparatus includes systems for: receiving the data from the terminal; arranging the relay devices in the network configuration information based on information about the relay devices; arranging the terminal in the network configuration information based on information about the terminal; arranging packet transmission time between the terminal and the relay devices in the network configuration information; and identifying a subnetwork from the data.

9 Claims, 10 Drawing Sheets

[Figure 1]
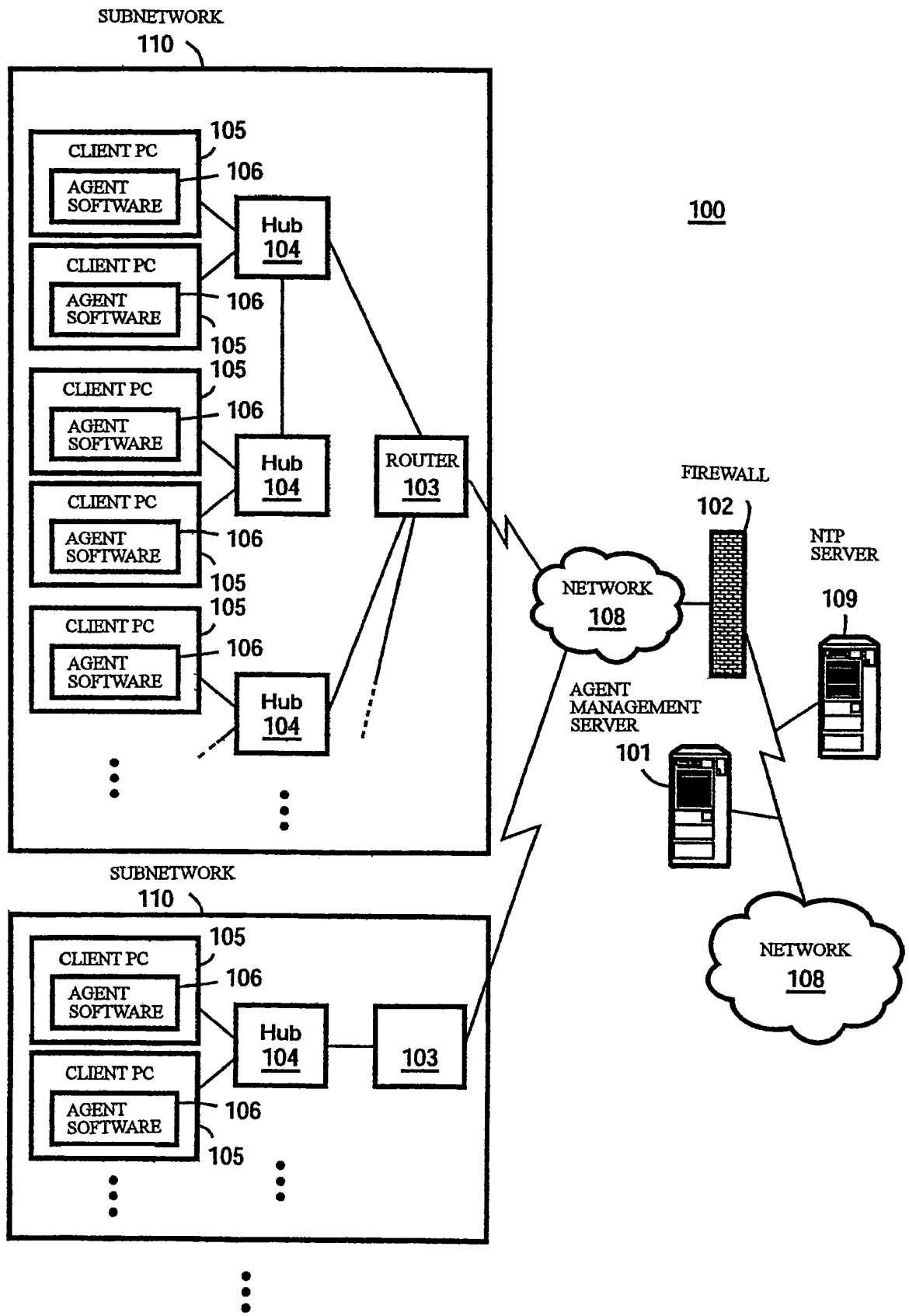

[Figure 2]
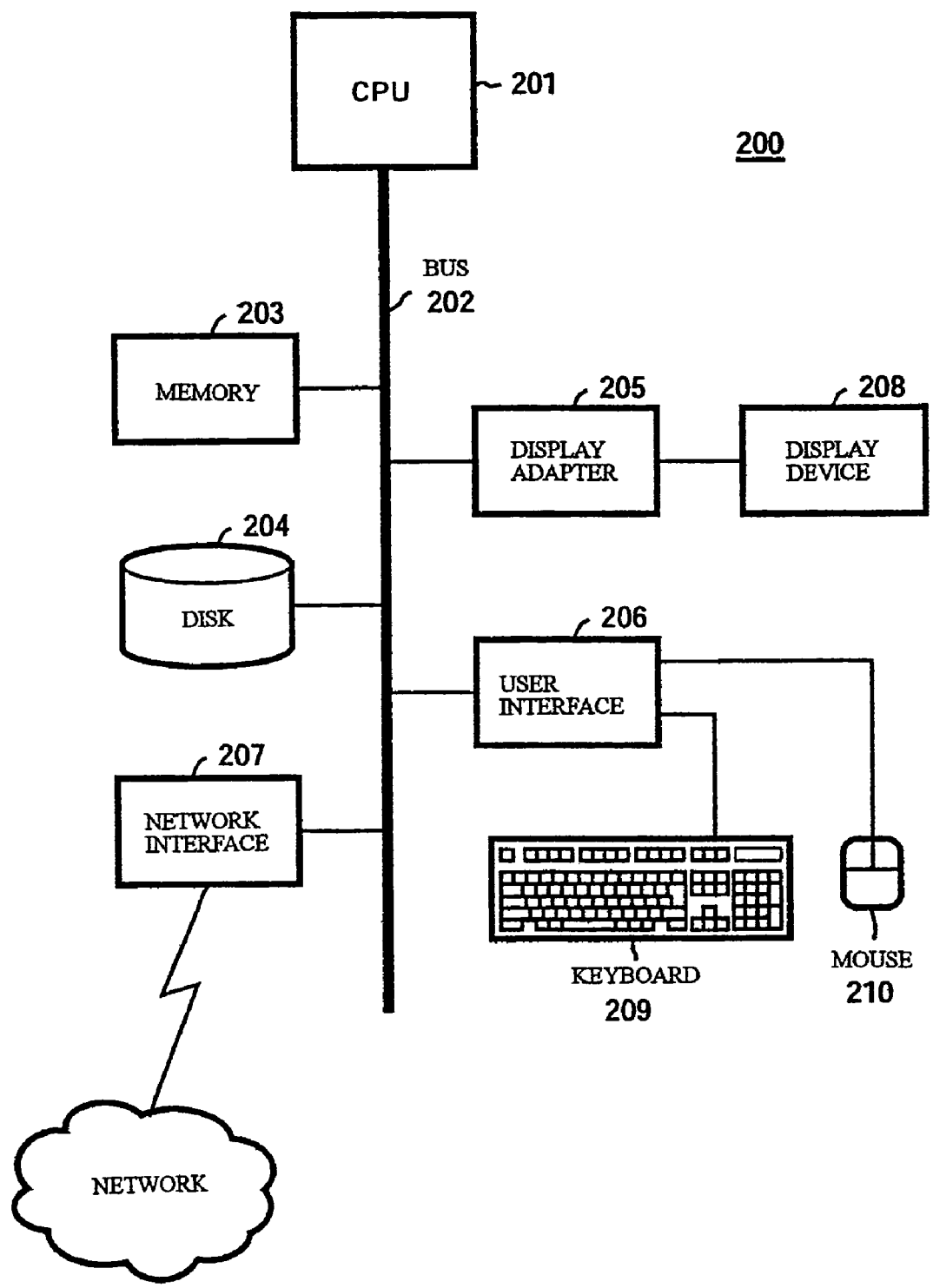

[Figure 3]
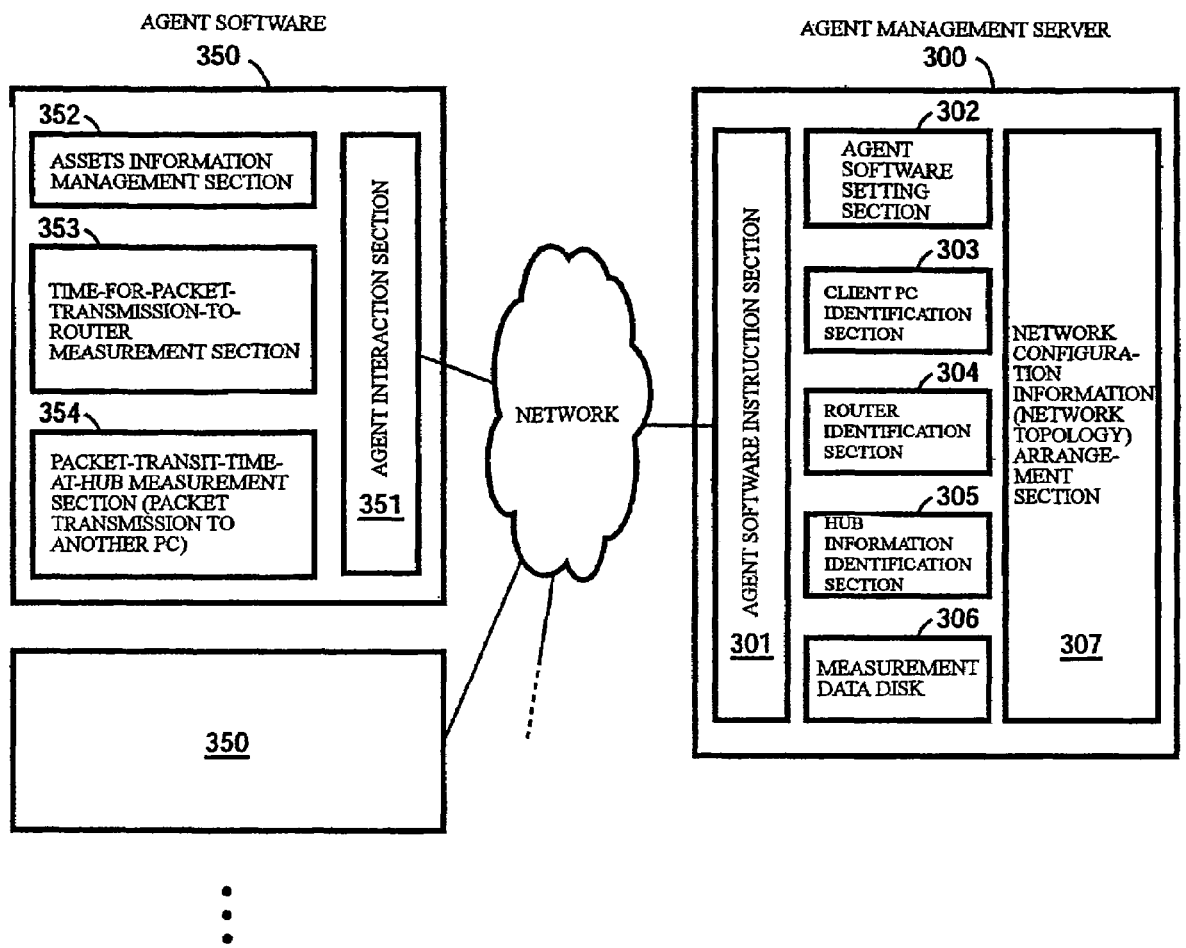

[Figure 4]
| 401 | 402 | 403 | 404 | 405 | 406 | 407 | 408 |
|---|---|---|---|---|---|---|---|
| LOCATION (Location) | S/N | MAC ADDRESS | IP ADDRESS | PACKET TRANS-MISSION TIME | SENDING TIME STAMP | RECEIVING TIME STAMP | DIFFERENCE BETWEEN SENDING AND RECEIVING |
| B2FSW8-A | 99-MAPK6 | 09:6b:fa:4d:74:de | 192.168.63.162 | *0 | 1077170997110 | 1077170997141 | 31 |
| B2FSW7-B | 10-FXG96 | 00:10:20:e0:df:84 | 192.168.63.56 | *3 | 1077170123210 | 1077170123242 | 32 |
| B2FSW7-B | 2F-AGS67 | 0d:6a:33:11:d1:4c | 192.168.60.11 | *6 | 1077170309121 | 1077170309161 | 41 |
| 402 | 451 | 452 | 453 |
|---|---|---|---|
| S/N | PATH NUMBER | ROUTER IP ADDRESS | PACKET TRANSMISSION TIME |
| 99-MAPK6 | 1 | 192.168.63.1 | 10 |
| 99-MAPK6 | 2 | 192.168.3.1 | 10 |
| 99-MAPK6 | 3 | 192.168.3.100 | 11 |
| 10-FXG96 | 1 | 192.168.63.1 | 10 |
| 10-FXG96 | 2 | 192.168.3.1 | 11 |
| 10-FXG96 | 3 | 192.168.3.100 | 11 |
| 2F-AGS67 | 1 | 192.168.60.1 | 14 |
| 2F-AGS67 | 2 | 192.168.3.1 | 16 |
| 2F-AGS67 | 3 | 192.168.3.100 | 11 |
400
PACKET TRANSMISSION TIME TABLE
450
[Figure 5]
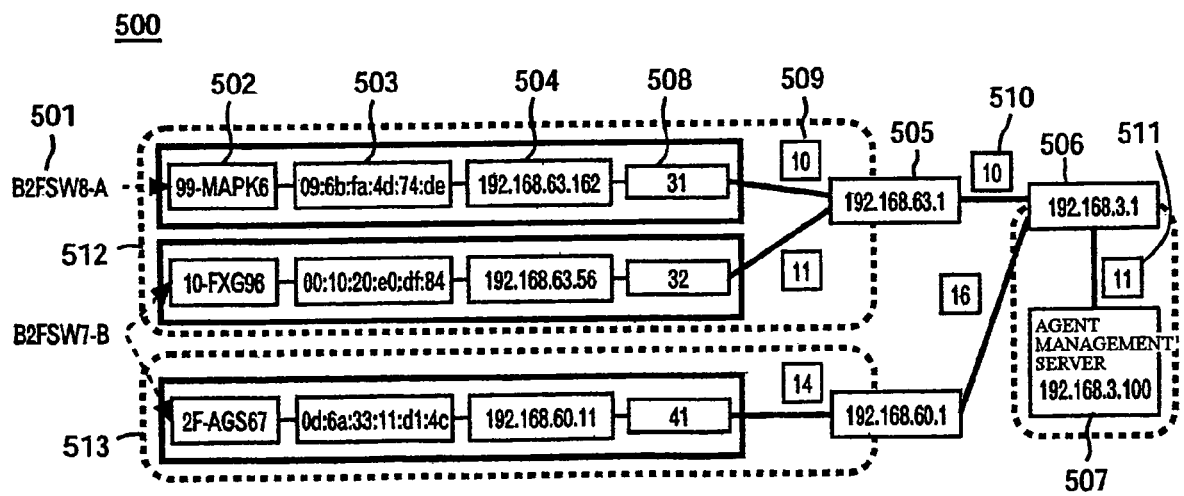

[Figure 6]
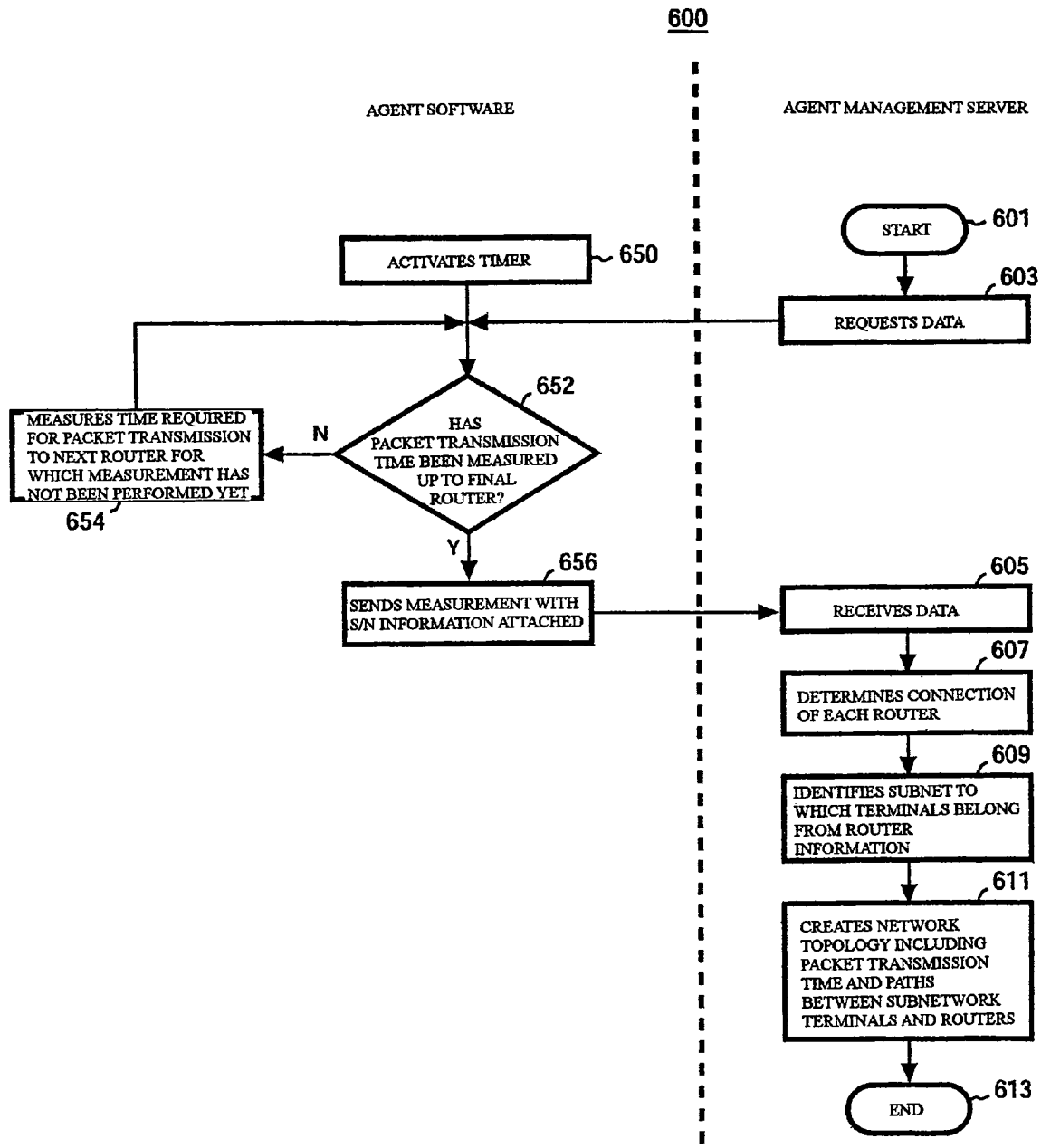

[Figure 7]
| | 701 | 702 | 703 | 704 |
|---|---|---|---|---|
| | LOCATION (Location) | S/N | MAC ADDRESS | IP ADDRESS |
| | B2FSW8-A | 99-MAPK6 | 09:6b:fa:4d:74:de | 192.168.63.162 |
| | B2FSW7-B | 10-FXG96 | 00:10:20:e0:df:84 | 192.168.63.56 |
| | B2FSW7-B | 2F-AGS67 | 0d:6a:33:11:d1:4c | 192.168.60.11 |
| | B2FSW7-B | 2F-FXA55 | 00:3b:29:e1:11:20 | 192.168.60.22 |
700
PACKET TRANSIT TIME TABLE
750
| 751 | 752 | 753 |
|---|---|---|
| SENDING TERMINAL | RECEIVING TERMINAL | PACKET TRANSIT TIME |
| 99-MAPK6 | 10-FXG96 | 8 |
| 99-MAPK6 | 2F-AGS67 | 12 |
| 99-MAPK6 | 2F-FXA55 | 12 |
| 10-FXG96 | 2F-AGS67 | 12 |
| 10-FXG96 | 2F-FXA55 | 12 |
| 2F-AGS67 | 2F-FXA55 | 10 |
[Figure 9]
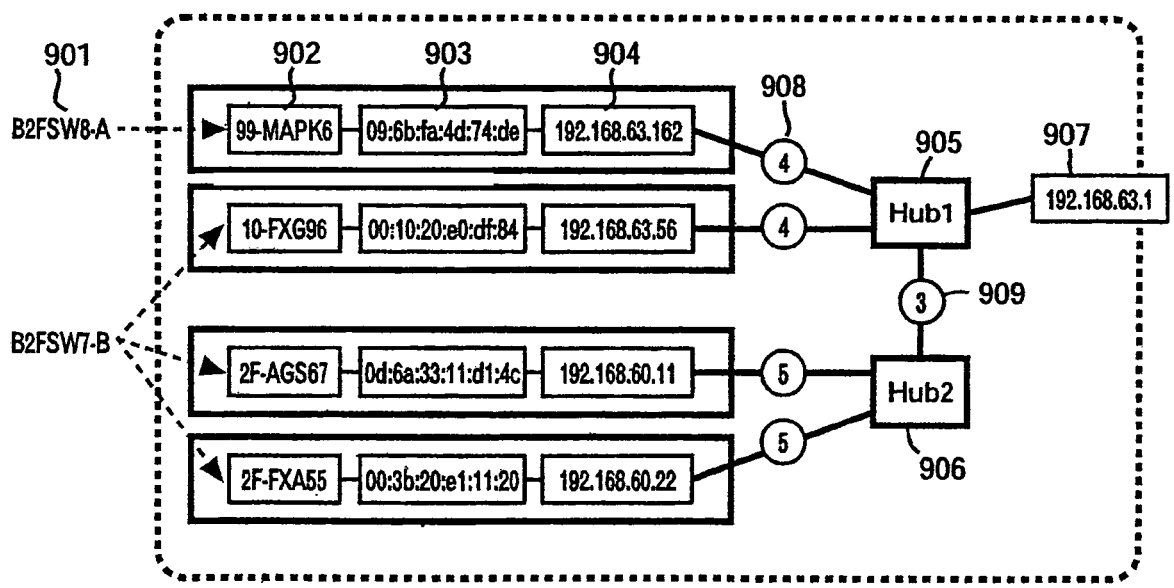

[Figure 8]
(A) TABLE FOR PACKET TRANSIT TIME AMONG PC'S
|     | PC1 | PC2 | PC3 | PC4 |
|-----|-----|-----|-----|-----|
| PC1 |     | 8   | 12  | 12  |
| PC2 | 8   |     | 12  | 12  |
| PC3 | 12  | 12  |     | 10  |
| PC4 | 12  | 12  | 10  |     |
PC1 : 99-MARK6
PC2 : 10-FXG96
PC3 : 2F-AGS67
PC4 : 2F-FXA55
(B) INSERTION OF Hub 2
|      | PC1 | PC2 | PC3 | Hub2 | PC4 |
|------|-----|-----|-----|------|-----|
| PC1  |     | 8   | 12  | 7    | 12  |
| PC2  | 8   |     | 12  | 7    | 12  |
| PC3  | 12  | 12  |     | ⑤    | 10  |
| Hub2 | 7   | 7   | ⑤   |      | ⑤   |
| PC4  | 12  | 12  | 10  | ⑤    |     |
(C) INSERTION OF Hub 1
|      | PC1 | Hub1 | PC2 | PC3 | Hub2 | PC4 |
|------|-----|------|-----|-----|------|-----|
| PC1  |     | ④    | 8   | 12  | 7    | 12  |
| Hub1 | ④   |      | ④   | 8   | 3    | 8   |
| PC2  | 8   | ④    |     | 12  | 7    | 12  |
| PC3  | 12  | 8    | 12  |     | 5    | 10  |
| Hub2 | 7   | 3    | 7   | 5   |      | 5   |
| PC4  | 12  | 8    | 12  | 10  | 5    |     |
(D) CONNECTION OF COMPONENTS
|      | PC1 | Hub1 | PC2 | PC3 | Hub2 | PC4 |
|------|-----|------|-----|-----|------|-----|
| PC1  |     | 1    | 0   | 0   | 0    | 0   |
| Hub1 | 1   |      | 1   | 0   | 1    | 0   |
| PC2  | 0   | 1    |     | 0   | 0    | 0   |
| PC3  | 0   | 0    | 0   |     | 1    | 0   |
| Hub2 | 0   | 1    | 0   | 1   |      | 1   |
| PC4  | 0   | 0    | 0   | 0   | 1    |     |
0: NOT CONNECTED
1: CONNECTED
(E) CONNECTION BETWEEN PC AND Hub
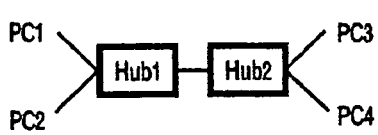

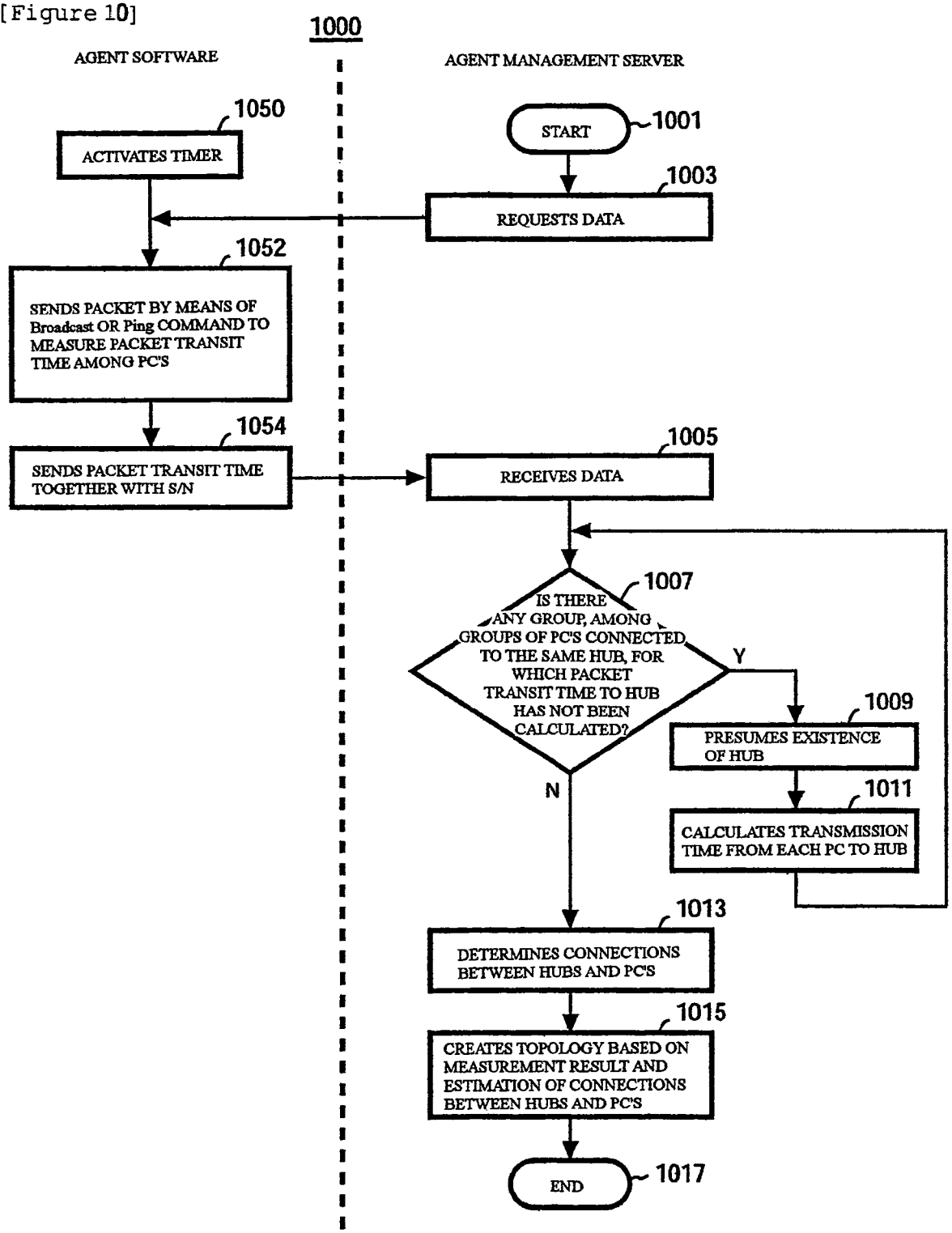

[Figure 11]

| LOCATION (Location) | S/N | MAC ADDRESS | IP ADDRESS |
|---|---|---|---|
| B2FSW8-A | 99-MAPK6 | 09:6b:fa:4d:74:de | 192.168.63.162 |
| B2FSW7-B | 10-FXG96 | 00:10:20:e0:df:84 | 192.168.63.56 |
| B2FSW7-B | 2F-AGS67 | 0d:6a:33:11:d1:4c | 192.168.60.11 |
| B2FSW7-B | 2F-FXA55 | 00:3b:29:e1:11:20 | 192.168.60.22 |
| 3F-BXT31 | B3FSW7-B | 00:34:21:c1:1d:c3 | 192.168.63.12 |
| 3F-BZL10 | B3FSW7-B | 08:4c:2b:ac:e0:60 | 192.168.63.21 |

1101

| S/N | PATH NUMBER | ROUTER IP ADDRESS | PACKET TRANSMISSION TIME |
|---|---|---|---|
| 99-MAPK6 | 1 | 192.168.63.1 | 10 |
| 99-MAPK6 | 2 | 192.168.3.1 | 10 |
| 99-MAPK6 | 3 | 192.168.3.100 | 11 |
| 10-FXG96 | 1 | 192.168.63.1 | 10 |
| 10-FXG96 | 2 | 192.168.3.1 | 11 |
| 10-FXG96 | 3 | 192.168.3.100 | 11 |
| 2F-AGS67 | 1 | 192.168.60.1 | 14 |
| 2F-AGS67 | 2 | 192.168.3.1 | 16 |
| 2F-AGS67 | 3 | 192.168.3.100 | 11 |
| 2F-FXA55 | 1 | 192.168.60.1 | 14 |
| 2F-FXA55 | 2 | 192.168.3.1 | 11 |
| 2F-FXA55 | 3 | 192.168.3.100 | 11 |
| 3F-BXT31 | 1 | 192.168.63.3 | 12 |
| 3F-BXT31 | 2 | 192.168.3.1 | 16 |
| 3F-BXT31 | 3 | 192.168.3.100 | 11 |
| 3F-BZL10 | 1 | 192.168.60.3 | 12 |
| 3F-BZL10 | 2 | 192.168.3.1 | 16 |
| 3F-BZL10 | 3 | 192.168.3.100 | 11 |

1102

| SENDING TERMINAL | RECEIVING TERMINAL | PACKET TRANSIT TIME |
|---|---|---|
| 99-MAPK6 | 10-FXG96 | 8 |
| 99-MAPK6 | 2F-AGS67 | 12 |
| 99-MAPK6 | 2F-FXA55 | 12 |
| 10-FXG96 | 2F-AGS67 | 12 |
| 10-FXG96 | 2F-FXA55 | 12 |
| 2F-AGS67 | 2F-FXA55 | 10 |

1103

[Figure 12]
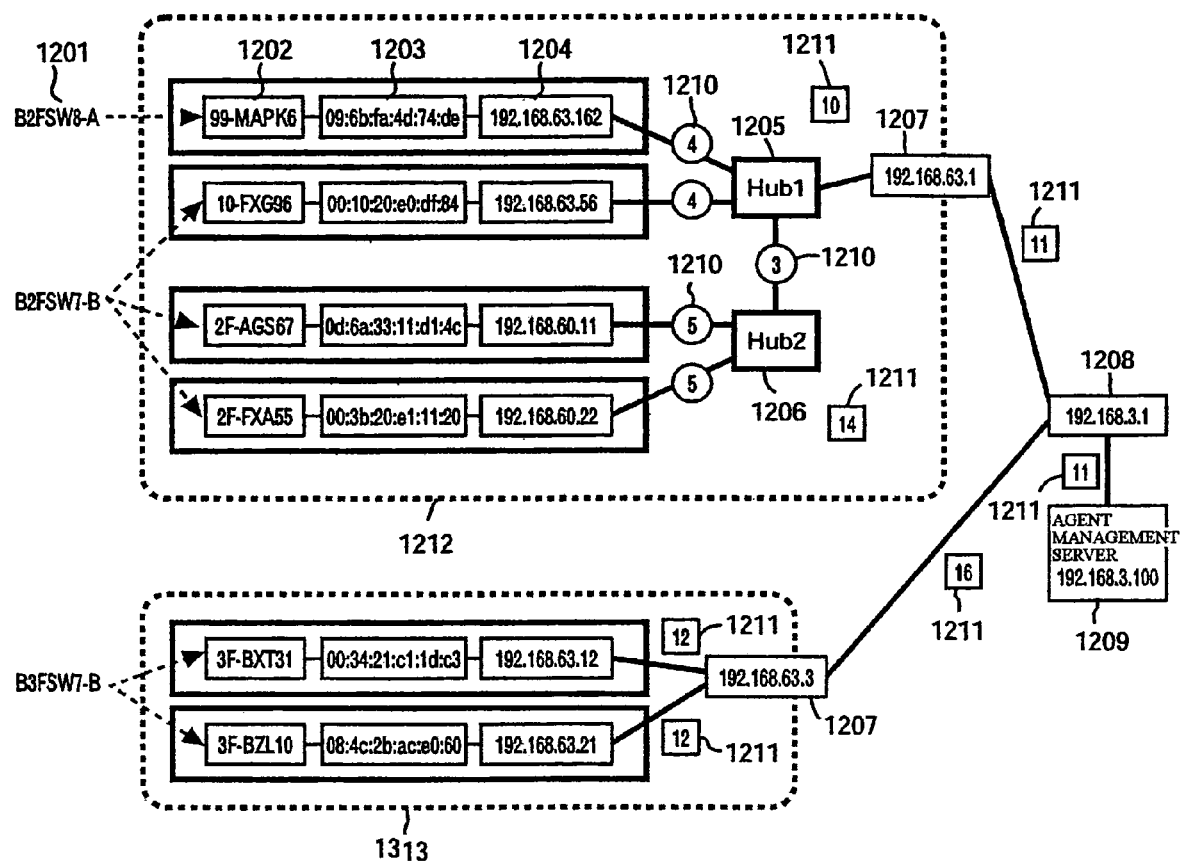

APPARATUS, METHOD, AND PROGRAM FOR CREATING NETWORK CONFIGURATION INFORMATION

FIELD OF THE INVENTION

The present invention relates to an apparatus for collecting information about equipment such as computers and routers connected to a network and creating network topology (network configuration information) which includes packet transmission time of paths among components within the network. The present invention also relates to a method and program for creating the network topology and a program for creating the network topology.

BACKGROUND ART

Recently, it has been possible to manage assets information about equipment such as computers connected to a network held by a company or the like. For example, by utilizing SNMP (Simple Network Management Protocol), it is possible to automatically collect MAC addresses and IP addresses to examine a part of a network equipment configuration. It is also possible to collect information about equipment connected to a network with the use of a technique such as an agent technique and utilize the information for system recovery in the case of system failure.

According to Japanese Published Unexamined Patent Application No. 9-93265, multiple distributed managers are provided in a communication network; information about nodes is collected from so-called SNMP agents belonging to the respective distributed managers to create topology information; higher distributed managers collect the topology information to create topology information about partial networks; still higher distributed managers collect the topology information about the partial networks to create topology information about partial networks; and this is repeated until topology information about the entire network is finally created.

According to Japanese Published Unexamined Patent Application No. 10-161956, a network management system holds predetermined configuration information which includes management system identification information for identifying the network management system, component identification information for identifying network components and time information indicating times when the network management system and the network components are connected and which indicates system configuration, and thereby the network management system can easily activate a system in accordance with a predetermined activation procedure based on configuration information collected from the network components and the configuration information it holds. Furthermore, the network management system compares the configuration information collected from the network components with the configuration information it holds, and if management system identification information of both of the configuration information corresponds to each other, and time information of both of the configuration information corresponds to each other, but component identification information of both of the configuration information does not correspond to each other, then the network management system gives new component identification information to the network components to continue the operation. Thereby, activation or maintenance operation for initial setting in the case of failure is facilitated.

According to the above-described conventional techniques, assets management of equipment constituting a network is facilitated, and it is possible to cope with recovery in the case of failure in a network to some extent.

However, if a failure occurs in a network and the cause of the failure is not known, it is necessary to perform failure analysis and system diagnosis. In this case, for which part an analysis tool should be executed is basically determined based on a system administrator's experience and intuition, and therefore, it is troublesome to cope with the failure. Especially in a large-scaled network or a network including an web environment, if a failure occurs, a great amount of time and labor is required for grasping relative performance time among network component devices, identifying a bottleneck position and analyzing the problem. Even if any of the technique of the above-identifies references is used, it still depends on the system administrator's intuition and experience, that is, his personal abilities to grasp performance time and identify a bottleneck position. In such a situation where it is difficult to grasp performance time and a bottleneck, it is inevitable to again depend on the system administrator's personal abilities even in system designing for renewal of the system or partial change in the network. It is expected that this will be very difficult work in most cases. Furthermore, in the case of replacement of the system administrator, problem analysis, system designing, system change and the like required when a network failure occurs will be very difficult for a new network administrator.

In the case of a network component device without SNMP functions, such as a hub, information about the network component device cannot be automatically acquired, and therefore, the network device will drop from the network topology and the actual connection form cannot be accurately grasped, unless the network device is manually added to the network topology. Furthermore, it is not desirable to manage a network based on the SNMP functions, because, in this case, a great amount of load is imposed on the network when data is collected from network component devices, and functional deterioration of the whole network is caused even if only a part of the network is abnormal.

SUMMARY OF THE INVENTION

Accordingly, an object of the present invention is to provide an apparatus, method, and program for collecting information about devices such as computers, routers and hubs connected to a network and creating network topology (network configuration information) including packet transmission time among component devices in the network.

In order to solve the above problem, there is provided, in the present invention, an apparatus for creating network configuration information from data including packet transmission time between one or more relay devices and a terminal, the relay devices relaying a signal which runs through a network and is measured by the terminal connected to the network, to another network, information about the relay devices and information about the terminal. The apparatus receives the data from the terminal; identifies the connections, locations of the relay devices and subnetworks from the data; identifies the location of the terminal within the network from the data; and arranges the connections of the relay devices, the subnetworks and the terminal and the packet transmission time in the network configuration information from the identified location. Packet transmission time is grasped for each of paths between terminal devices such as client PCs connected to a network and a device controlling the network, such as a router, which relays a signal flowing through the network to another network, and a subnetwork can be grasped from information about the router such as an IP address. Network topology information is created based on the information about such subnetworks and the acquired serial numbers, MAC addresses and IP addresses of the terminals such as client PCs. Thereby, a system administrator can easily grasp problems when a failure occurs or when the system is modified or partially changed.

Furthermore, in the present invention, there is also provided an apparatus for creating network configuration information from data including packet transit time between a terminal connected to a subnetwork of a network and another terminal connected within the subnetwork, the packet transit time being measured by a terminal connected to the network, and assets information including an identifier of the terminal. The apparatus receives the data from the terminal; identifies a group of multiple terminals connected to the same hub from the data; identifies the hub; arranges the hub in the network configuration information; arranges the terminal in the network configuration information based on information about the terminal; and arranges packet transit time between the terminal and the hub in the network configuration information. It is possible to identify network devices such as hubs without SNMP functions, from the packet transit time among client PCs and create network topology including such network devices.

Furthermore, the above-described invention for creating network topology in which routers are identified can be combined with the invention for identifying hubs to create network topology as appropriate, and the combination makes it possible to easily create network topology in which both routers and hubs are identified. Any of the processes may be executed first in this combination.

The above-described summary of the invention does not enumerate all necessary features of the present invention, and sub combination of these features can also be the invention.

The present invention will be described below through an embodiment of the invention. The embodiment described below, however, does not limit the present invention to the Claims. Furthermore, combinations of features described in the embodiment are intended to make the content of the invention to be easily understood, and all of them are not necessarily required as solution means of the invention.

BRIEF DESCRIPTION OF THE DRAWINGS

FIG. 1 is a schematic diagram of network configuration on which a system for creating network topology operates;

FIG. 2 shows an example of a hardware configuration on which an agent management server and agent software operate;

FIG. 3 shows an example of a functional block diagram of the agent management server and the agent software (client PC);

FIG. 4 shows an example of packet transmission time/assets management data from the agent software;

FIG. 5 shows an example of a network topology determined from the packet transmission time/assets management data from the agent software;

FIG. 6 shows overview of a process flow for determining network topology from the packet transmission time/assets management data from the agent software;

FIG. 7 shows an example of packet transit time among client PCs measured by the agent software;

FIG. 8 shows an example of a method for analyzing packet transit time at a hub;

FIG. 9 shows an example of a network topology determined from packet transit time among client PCs accompanied by assets management data;

FIG. 10 shows overview of a process flow for determining network topology from the packet transit time among client PCs;

FIG. 11 shows an example of data of assets information about client PCs, packet transmission time and packet transit time; and FIG. 12 shows an example of network topology including routers and hubs.

DETAILED DESCRIPTION OF THE INVENTION

FIG. 1 shows an overview of network configuration 100 in which a system for creating network topology operates. The network configuration 101 not only includes include common network components but also may include special network components. The components are not limited to those disclosed herein. The network is not limited to a wired network, and a part or all of the network may be wirelessly configured. Reference numeral 101 denotes an agent management server. Here, the agent management server 101 has the function of collecting information from agent software 106 and creating network topology. This function, however, may be performed by a different server or terminal. Reference numeral 102 denotes a firewall. The firewall 102 is not required to be located at the shown position. The position is shown only as an arrangement example in a common network. Reference numeral 103 denotes a relay device for relaying a signal flowing through the network to another network, which is a so-called router. Reference numeral 104 denotes a hub for a network to be used in star wiring within a LAN (local area network). Reference numeral 105 denotes a terminal, which is shown as a client PC here to make the invention to be easily understood. The client PC 105 may be any terminal only if it can operate a program, and may be a terminal including equipment such as a printer, for example. Reference numeral 106 denotes agent software, which operates on a client PC, measures time for packet transmission to a router, packet transit time among client PCs and the like, and sends the measured values to the agent management server 101 together with or separately from assets information. Reference numeral 108 denotes a network such as the Internet and an intranet within a company. Reference numeral 109 denotes an NTP (Network Time Protocol) sever for adjusting time. The NTP server 109 is used for adjusting time for each client PC, subordinate server and the like. However, the NTP server 109 is not necessarily required if an atomic clock or the like is realized. Reference numeral 110 denotes a subnetwork covered by each router 103.

FIG. 2 shows overview of hardware configuration 200 in which an agent management server and the agent software operate. A CPU 201 which is a central processing unit executes various programs under the control of various OSs. The CPU 201 is mutually connected with a memory 203, a disk 204, a display adapter 205, a user interface 206 and a network interface 207 via a bus 202. The CPU 201 is connected to a keyboard 209 and a mouse 210 via a user interface 206, connected to a display device 208 via a display adapter 205, and connected to a network via a network interface 207. The memory 203 includes a main memory and a cache memory, and the cache memory is used to store measurement data such as packet transmission time/assets management data sent from the agent and to hold created network topology information. In the disk 204, a program for realizing a function of managing the agent and creating network topology is recorded, and the program is read in the memory 203 and executed at the time of execution. In the disk 204, the measurement data such as packet transmission time and assets management data is also stored. A similar hardware configuration is also applicable when the agent software operates on a client PC. The agent program read in the memory 203 is executed by the CPU 201; assets management information, in addition to the agent program, is held in the disk 204; and the assets management information and the like about the client PC is sent in response to an instruction from the agent management server 101. This hardware configuration 200 is only an example of an embodiment of a computer system and bus arrangement, and the features of the present invention can be realized in various system configurations in an embodiment in which the same multiple components are provided or in an embodiment in which the components are distributed on a network.

FIG. 3 schematically shows functional blocks of an agent management server 300 and agent software 350 (client PC). First, the agent management server 300 will be described. An agent software instruction section 301 has a function for sending/receiving data to/from the agent software and makes an instruction such as a request to send assets information, time for packet transmission to a router and packet transit time at a hub, that is, the agent software is a section for controlling interface with the agent software. Usually, the agent software instruction section 301 sends/receives data to/from the agent software via a network. An agent software setting section 302 is provided for making settings for the agent software 350. For example, it is used to set activation of a timer for the agent software 350 or set frequency of measurement of packet transmission time. A client PC identification section 303 identifies information about, and the location of, a client PC. The client PC identification section 303 has a function of identifying the locations (condition of connections to subnetworks or segments, and the like) of client PCs in the network based on measurement data in a measurement data disk 306, such as serial numbers (identifiers), MAC addresses and IP addresses of client PCs, packet transmission times between the client PCs and routers and router IP addresses, and information in a router identification section 304 and a hub information identification section 305 to be described later.

A network configuration information arrangement section 307 arranges the client PCs in network configuration information based on the information in the client PC identification section 303.

The router identification section 304 identifies information about a router. The router identification section 304 has a function of identifying a subnetwork or identifying connection or packet transmission time among routers, based on the router IP addresses or packet transit time from client PCs to routers of a measurement data disk 306. The hub information identification section 305 analyzes information about a hub, and has a function of identifying locations of hubs based on packet transit time among client PCs in the measurement data disk 306, calculating packet transit time between client PCs and the hub, and identifying a segment of a network covered by the hub. In the measurement data disk 306, there is stored data received from the agent software of client PCs, such as packet transmission time, assets information about the client PCs and router IP addresses. A network configuration information (network topology) arrangement section 307 arranges routers, hubs, client PCs, packet transmission times and the like in the network configuration information, based on connections, subnetworks and segments of the routers, connections of the hubs, clients and client PCs identified by the client PC identification section 303, the router identification section 304 and the hub information identification section 305. Since both the information about the routers and information about the hubs are related to connection to each client PC, the sections 303 to 306 function in cooperation with one another.

The agent software 350 will be now described. An agent interaction section 351 has a function of sending/receiving data with the agent management server or other client PCs, that is, a function of interfacing with other agents and the like. An assets information management section 352 has a function of managing assets information about client PCs. The assets information includes serial numbers (identifiers), IP addresses, MAC addresses and the like. The assets information management section 352 itself may hold the assets information in advance, or may acquire serial numbers or MAC addresses each time in response to a data transmission request from the agent management server. A time-for-packet-transmission-to-router measurement section 353 has a function of measuring time for packet transmission to a router. To measure packet transmission time from client PCs to the agent management server, times for packet transmission to routers on the paths to the agent manager are sequentially measured, for example, with the use of an existing command, such as TRACERT, provided for Windows® which is an operating system of Microsoft Corporation, and IP addresses of the routers are acquired.

A packet-transit-time-at-hub measurement section 354 has a function of measuring packet transit time at a hub. Actually, a packet is sent among client PCs within a subnetwork through broadcast or the like, and the sending time and receiving time of the packet, a sending client PC and receiving client PCs which have performed the sending and receiving are recorded. Usually, the packet receiving side records the information and sends it to the agent management server, and the hub information identification section 305 of the client management server analyzes the packet transit time (delay time) at a hub. A method for analyzing the packet transit time at a hub will be described later. Though, in FIG. 3, each function is indicated by a block and arranged, the block of each function can be defined in various ranges, and the block configuration may be realized in other forms if these functions are provided, and is not limited to the shown block configuration.

FIG. 4 shows an example of packet transmission time/assets management data 400 from the agent software. Location 401 indicates a location where a client PC is installed. S/N 402 indicates a serial number or the like of the client PC, which is a so-called terminal identifier, and any identifier may be used which can identify a terminal such as each client PC and a printer. Reference numeral 403 denotes a MAC address. Reference numeral 404 denotes an IP address. Packet transmission time 405, the time required for packet transmission to a router, shows a pointer to a packet transmission time table. Since there are multiple paths to the router, it is desirable to manage the paths by means of a separate table (the packet transmission time table 450). Sending a time stamp 406 indicates the time when data (a packet) is sent from a client PC. Receiving time stamp 407 indicates the time when a packet reaches the agent management server. The sending time stamp 406 is given by a client PC, while the receiving time stamp 407 is given by the agent management server. Path number 451 indicates which path has been used and is for determining a path from a client PC to the router or a path from the router to a router. Router IP address 452 indicates an IP address of a router which has relayed a packet. Since a packet reaches the agent management server eventually, the IP address of the agent management server is also included as the router IP address 452. Packet transmission time 453 indicates time required for a packet to run though each of paths among routers. Such time measurement may be performed in advance by the agent software with the use of an existing command such as TRACERT provided for Windows® of Microsoft Corporation, or other commands may be used.

FIG. 5 shows an example of network topology 500 determined from the packet transmission time/assets management data 400 from the agent software. Reference numeral 501 denotes a location of a client PC. Reference numeral 502 denotes the identifier (the serial number or the like) of the client PC. Reference numeral 503 denotes the MAC address of the client PC. Reference numeral 504 denotes the IP address of the client PC. Reference numerals 505 and 506 denote IP addresses of routers. Reference numeral 507 denotes the IP address of the agent management server. Reference numeral 508 denotes time required for a packet from the client PC to reach the agent management server. Reference numeral 509 denotes time required for the packet from the client PC to reach a router 505. Reference numeral 510 denotes time required for the packet from the router 505 to reach a router 506. Reference numeral 511 denotes time required for the packet from the router 506 to reach the agent management server 507. Though the value denoted by reference numeral 508 is not necessarily required because it can be determined by adding the values denoted by reference numerals 509 to 511, it is shown for convenience. The network topology is divided into sections denoted by reference numerals 512 and 513 so that subnetworks can be grasped. The subnetworks can be grasped from routers positioned at the lowest.

FIG. 6 shows overview of a process flow 600 for determining the network topology 500 from the packet transmission time/assets management data 400 from the agent software. The right side of the figure shows a process to be performed by the agent management server 300, and the left side shows a process to be performed by the agent software 350 operating on a client PC. The process starts at step 601 on the agent management system. The agent management server issues a request to send packet transmission time/assets management data, to the agent software of a client PC (step 603). The agent software starts processing for measuring time for packet transmission to a router and sending the measurement result to the agent management server, in response to a request from the agent management server. Alternatively, the measurement may be started by activation of a timer (step 650). The agent software uses an existing command such as TRACERT to start measurement of router transit time. At step 652, it is determined whether the time for packet transmission to a final router (a destination router) has been measured. The final router may be the agent management server. If the time for packet transmission to the final router has not been measured yet (in the case of No), the process proceeds to step 654 to sequentially measure times for packet transmission to routers up to the first router for which measurement has not been performed. The packet transmission time to routers up to the first router for which measurement has not been performed are measured at step 654, and the process returns to step 652. At step 653, if it is determined that the time for packet transmission to the final router has been measured (in the case of Yes), then the process proceeds to step 656. At step 656, the agent software reads serial numbers, router IP addresses and router transit times, and sends the packet transmission time/assets management data (step 656).

The agent management server receives the packet transmission time/assets management data (step 605). At step 607, arrangement of each of routers existing between the agent management server and the client PCs is determined from information such as the router IP addresses (step 607). Subnetworks to which the client PCs belong are identified from the determined arrangement of the routers (step 609). At step 611, network topology is created in which subnetworks are differentiated from one another, information about the client PCs (terminals) such as serial numbers (identifiers) and connections with routers (paths) are shown, and packet transmission times between the client PCs and the routers or among the routers are attached to portions indicating connections (paths) between the terminals and the routers or among the routers. As method for creating network topology, it is possible to create network topology based on connections between client PCs and routers because the connections can be easily determined from the packet transmission time/assets management data. A lot of known approaches can be used to create the network topology, and one skilled in the art can easily understand this. Therefore, a detailed description thereof will be omitted here. An example of created network topology is shown in FIG. 5. At step 613, the process ends.

FIG. 7 shows an example of packet transit time 700 among client PCs 700 measured by the agent software 106. Here, data of packet transit time among client PCs to which assets management data is added is shown. The agent software sends a packet by means of a broadcast or ping command within a subnetwork constituted by other client PCs and the like connected to a router, and determines whether there is a hub or not from packet transit times. Since the broadcast or ping command cannot go beyond a router, the measurement must be done within each subnetwork. Location 701 indicates a location where a client PC is installed. S/N 702 indicates an identifier such as a serial number of the client PC, and any identifier may be used which can identify a terminal such as each client PC and a printer. Reference numeral 703 denotes the MAC address of the client PC. Reference numeral 704 denotes the IP address of the client PCs. Reference numerals 701 to 704 denote the same assets information about client PCs as are denoted by reference numerals 401 to 404 in FIG. 4. This information may be newly received from the agent software, or the data in FIG. 4 may be used. Reference numeral 750 denotes a packet transit time table showing packet transit time measured by the agent software sending a broadcast or ping command to other client PCs. Sending terminal 751 indicates a client PC which has sent a packet by means of a broadcast or ping command. Receiving terminal 752 indicate client PC which has received the packet. Packet transit time indicates the time required for a packet from a sending terminal to reach a receiving terminal. This is calculated from sending time and receiving time, and therefore, information about the sending time and the receiving time may be held instead of the packet transit time 753.

FIG. 8 is a method for analyzing packet transit time at a hub. The agent software operating on a client PC sends a packet by means of a broadcast or ping command to other client PCs, and the agent management server checks for connection (existence) of a hub from packet transit time determined from the sending time and receiving time of the packet. Table (A) shows transit time between sending and receiving of the packet among client PCs 1 to 4 in a matrix. The packet transit time is determined by a packet being sent and received among pieces of agent software on the respective client PCs. Next, in Table (B), a group of client PCs for which the packet transit time from another client PC is the same is found. Here, the PC 3 and the PC 4 have the same value 12 as the packet transit time from the PC 1 and the PC 2, respectively. That is, the PC 3 and PC 4 are presumed to be connected to the same hub. Accordingly, a hub 2 is inserted between the PC 3 and PC 4. The packet transit time between the PC 3 and the PC 4 is 10, and accordingly, the packet transit time from the PC 3 to the hub 2 and the packet transit time from the hub 2 to the PC 4 are estimated to be 5, the half of 10. The packet transit time from the PC 1 to the PC 3 is 12, and the packet transit time from the hub 2 to the PC 3 is 5, and accordingly, the packet transit time from the PC 1 to the hub 2 can be estimated to be 7. Similarly, the packet transit time from the PC 2 to the hub 2 can be calculated and estimated to be 7.

In Table (C), a group of client PCs the packet transit time from another client PC is the same is further found. The PC 1 and the PC 2 are determined to have the same value 12 for the packet transit time from the PC 3 and PC 4, respectively, and therefore determined to be in the same group. That is, the PC 1 and the PC 2 are presumed to be connected to the same hub. Accordingly, a hub 1 is inserted between the PC 1 and the PC 2. The packet transit time between the PC 1 and the PC 2 is 8, and accordingly, each of the packet transit time from the PC 1 to the hub 1 and the packet transit time from the hub 1 to the PC 2 can be estimated to be 4. Based on this, by subtracting 4, which is the packet transit time between the PC 1 and the hub 1, from 12, which is the packet transit time from the PC 1 to the PC 3, the packet transit time from the hub 1 to the PC 3 can be estimated to be 8. Similarly, the packet transit time from the hub 1 to the PC 4 can be estimated to be 8.

Next, preparation of Table (D) will be described. If a threshold of the packet transit time between two which are directly connected to each other, among PCs and hubs, is assumed to be 5, then any two with packet transit time equal to or below this threshold, among the client PCs and hubs, can be presumed to be directly connected. Accordingly, a value of 1, which indicates connection, is substituted for packet transit time values below 5 in Table (C), and a value of 0, which indicates non-connection, is substituted for other transit time values to create Table (D). According to this Table (D), which PC and which hub are directly connected to each other can be easily grasped. By connecting PCs and hubs having the value of 1 with one another based on Table (D), network configuration can be determined in which PCs and hubs are connected, as shown in (E).

FIG. 9 shows an example of network topology 900 determined from the packet transit time among client PCs 700 accompanied by assets management data. Reference numeral 901 denotes a location where a client PC is installed. Reference numeral 902 denotes the identifier (the identification number) of the client PC. Reference numeral 903 denotes the MAC address of the client PC. Reference numeral 904 denotes the IP address. Reference numerals 905 and 906 denote hubs. Reference numeral 907 denotes the IP address of a router constituting a subnetwork, and a router IP address determined from the processing shown through FIGS. 4 to 6 may be used. Reference numeral 908 denotes time estimated to be required for a packet to transit from a client PC to a hub. The time can be considered to be delay time before passing the hub. The existence of the hubs 905 and 906 can be determined in the process of obtaining Tables (A) to (D). Reference numeral 909 denotes estimated packet transit time among hubs.

FIG. 10 shows overview of a process flow 1000 for determining network topology 800 from the packet transit time among client PCs 700. The right side of the figure shows a process to be performed by the agent management server, and the left side shows a process to be performed by the agent software. At step 1001, the process starts. At step 1003, the agent management server issues a request to send data about packet transit times among client PCs. The agent software may start the process by activation of a time rat step 1050. The agent software sends a measurement packet to other client PCs. Agent software receives the measurement packet (step 1052). The measurement packet is sent by means of a broadcast or ping command to measure packet transit times among client PCs (step 952). It is desirable to send the measurement packet through broadcast which makes it possible to make measurement at a time, but this is not limiting. The agent software reads serial numbers, IP addresses, packet transit times among client PCs and the like, and sends them to the agent management system (step 1054). The agent management system acquires the assets information about client PCs and data about the packet transit time among client PCs 700 from the agent software (step 1005).

Next, it is checked whether there is any group of client PCs connected to the same hub within a subnetwork, for which the packet transit time to the hub has not been calculated, from the received packet transit time among client PCs 700 (step 1007). When any group is identified (Yes), then the process proceeds to step 1009, where existence of the hub connected to the group is presumed. Next, packet transit time from each client PC to the presumed hub is calculated. Then, the process returns to step 1007 to look for the next group. If there is not any group for which the packet transmit time to the hub has not been calculated (No) at step 1007, then the process proceeds to step 1013. At step 1013, connections among hubs and client PCs as shown in FIG. 8(E) are determined (step 1013). From the packet transit time between each client PC and each hub, an estimated connection between each client and each hub, network topology is created (step 1015). The process ends at step 917.

FIGS. 11 and 12 show network topology 1200 which is obtained by processing in which the process flow 600 in FIG. 6 and the process flow 1000 in FIG. 10 are combined and which includes assets information about client PCs 1101, packet transmission times 1102, packet transit times 1103, routers (relay devices) and hubs. Any of the flow 600 and the flow 1000 may be performed first. Alternatively, one of them may be performed while the other is being performed. Furthermore, they may be performed concurrently. One skilled in the art can easily understand that network topology can be created last after performing numeric value analysis and determining connections among network components. In FIG. 11, the sending time stamp 406, the receiving time stamp 407 and difference between sending and receiving 408 in FIG. 4 are omitted. This is because the same result can be obtained from the packet transmission time 1102 and they are not necessarily required.

FIG. 12 shows the network topology 1200 in which routers (relay devices) and hubs are included. Reference numeral 1201 denotes a location where a client PC is installed. Reference numerals 1202, 1203 and 1204 are a serial number (an identifier), a MAC address and an IP address of the client PC, respectively. Reference numerals 1025 and 1206 denote hubs, which are determined based on the description about FIGS. 7 to 10. Reference numerals 1207 and 1208 denote routers. Reference numeral 1209 denotes an agent management server. Reference numeral 1210 denotes packet transit time between a client PC and a hub or between hubs, and numerical values are surrounded by circles. Reference numeral 1211 denotes packet transmission time between a client PC and a router or between routers, and numerical values are surrounded by squares. Each of reference numerals 1212 and 1213 denotes a subnetwork. When packet transit time is measured between a client PC belonging to the subnetwork 1213, in which a hub does not exist, and another client PC, the transmission speed is significantly low compared to the case where a packet is transmitted only via a hub, because a packet is transmitted via a router. Accordingly, it is easily known that there is not a hub, and measurement of packet transit time is terminated. Therefore, among the packet transit time 1103 in FIG. 11, there is not shown packet transit time measured for a client PC belonging to the subnetwork 1213. According to the network topology 1200 determined by means of the present invention, a system administrator can easily grasp performance time among network components and positions to be bottlenecks of a network.

The present invention has been described with the use of an embodiment. However, the technical scope of the present invention is not limited to the scope described in the above embodiment. It is apparent to one skilled in the art that various changes or modifications can be made in the above embodiment. It is apparent from description in the Claims that embodiments in which such changes or modifications have been made are also included in the technical scope of the present invention.

The invention claimed is:

1. A method for creating network configuration information from network data including a packet transmission time between one or more relay devices and one or more terminals connected to a network, measured by a first terminal connected to the network, relay device data including location of the one or more relay devices within the network and connection with another network; and terminal data including location of the first terminal within the network including condition of connections to the network, comprising:
   receiving the network data by a computer including memory on a computer processor from the first terminal connected to the network;
   identifying a pathway between the one or more relay devices and the other network, and identifying locations of the one or more relay devices and locations of one or more sub-networks, based upon the data about the one or more relay devices;
   identifying the one or more relay devices, including identification of a sub-network from the one or more sub-networks, an identifying connection, and the packet transmission time among the one or more relay devices based on addresses associated with the one or more relay devices or a packet transit time from the one or more terminals to the one or more relay devices;
   identifying a relationship between the sub-networks and the one or more terminals based on an arrangement of the one or more relay devices;
   sending time stamps with packets wherein a receiving time stamp indicates a time the packet reaches a server and a sending time stamp indicates another time the packets leave the one or more terminals;
   determining groups of terminals from the one or more terminals for which packet transmission time to a hub has not been calculated from packet transmission time between the one or more terminals;
   determining another packet transmission time to a final relay device by measuring the packet transmission times for the one or more relay devices prior to the final relay device;
   identifying a location of the first terminal within the network, based upon the information about the first terminal contained in the terminal data;
   managing multiple paths to the one or more relay devices with reference to a table showing the packet transmission times for the one or more relay devices;
   arranging the network configuration information of the one or more relay devices, the hub, the one or more terminals, and the packet transmission times between the one or more relay devices and the one or more terminals based on network connections, sub-network data, and another data regarding the one or more terminals, the hub, and the one or more relay devices;
   storing terminal serial numbers, media access control addresses of the one or more terminals, internet protocol addresses of the one or more terminals, and packet transmission times between the one or more terminals and the one or more relay devices, as network configuration information, on a disk; and
   displaying the locations of the identified one or more relay devices, a pathway between the one or more relay devices and the another network, the sub-networks, the location of the one or more terminals and the packet transmission time among the one or more relay devices, as the network configuration information, wherein packet transmission and measurement of packet transmission time are performed concurrently.

2. The method for creating network configuration information according to claim 1, wherein
   the data includes the measured packet transmission time between the first terminal and another terminal connected within the sub-network; and
   the method includes identifying a group of multiple terminals connected to a same hub within the sub-network by identifying one of the one or more terminals whose packet transmission time is the same packet transmission time from among the one or more relay devices.

3. The method for creating network configuration information according to claim 2, wherein
   displaying the network configuration information includes a displaying the hub and the packet transmission time between the hub and the first terminal.

4. A method for creating network configuration information from network data including a packet transmission time between a first terminal connected to a network of one or more terminals and another terminal connected within a sub-network of the network where the first terminal is connected, measured by the first terminal connected to the network, and asset data including terminal identifiers, and location data, comprising the steps of:
   receiving the network data by a computer including memory on a computer processor, from the first terminal connected to the network;
   identifying a group of multiple terminals from the one or more terminals wherein the group of multiple terminals is connected to a same hub by identifying the terminals from the one or more terminals whose packet transmission time is the same as one another
   identifying another hub including whether or not the identified hub is directly connected to the first terminal by determining if packet transmission time between the identified hub and the first terminal is a predetermined threshold or less;
   determining other groups of terminals from the one or more terminals for which a packet transmission time to the identified hub has not been calculated from the packet transmission time between the one or more terminals;
   identifying segments of the network covered by the identified hub;
   identifying locations of other hubs based on packet transmission time among the one or more terminals contained in the network data;
   identifying a location of the first terminal within the network including a condition of connections to the network, based upon the asset data contained in the network data;
   storing terminal serial numbers, media access control addresses of the one or more terminals, internet protocol addresses of the one or more terminals, and packet transmission times between the one or more terminals and one or more relay devices, as a network configuration information, on a disk; and displaying the identified hub connected to the first terminal, a pathway between the identified hub and the first terminal, the first terminal and the packet transmission time between the first terminal and the another terminal, as the network configuration information, wherein packet transmission and measurement of packet transmission time are performed concurrently.

5. The method for creating network configuration information according to claim 4, wherein the network data includes the measured packet transmission time between one or more relay devices, which relay a signal running through the network to another network, and the first terminal, and data about the relay devices including location data about the relay devices and connection information with the another network, and the method comprises identifying a pathway between the relay devices and the another network, locations of the relay devices and sub-networks within the network, based upon the data about the relay devices contained in the network data;

identifying the data about the relay devices, including data identifying a sub-network among the sub-networks, an identifying connection, and packet transmission time among the relay devices based on addresses of the relay devices or packet transmission time from the one or more terminals to relay devices; and identifying a relationship between the sub-networks and the one or more terminals based on the arrangement of the relay devices.

6. The method for creating network configuration information according to claim 5, wherein displaying the network configuration information includes a displaying the packet transmission time in the network configuration information.

7. A method for collecting and sending a network information, comprising:

measuring a packet transmission time between a terminal connected to a network and one or more relay devices for relaying a signal, which runs through the network, to another network, respectively, identifying a sub-network, an identifying connection, and packet transmission time among the relay devices based on addresses of the relay devices or packet transmission time from terminals to the relay devices;

determining whether packet transmission time to a hub from the terminal has not been calculated;

identifying the relationship between the sub-network and the terminal based on the arrangement of the relay devices;

using memory on a computer processor for storing a terminal serial number, a media access control address of the terminal, and an internet protocol address of the terminal, as a network configuration information, on a disk;

storing, sending and receiving times in place of packet transmission time;

managing multiple paths to the relay devices with a table showing packet transmission times; and sending data including asset data including an identifier of the terminal, the packet transmission time and identifying data about the relay devices, to an apparatus for managing network information, which includes the packet transmission time and the information about the relay devices, and in which the sub-network is identified, wherein packet transmission and measurement of packet transmission time are performed concurrently.

8. The method for collecting and sending network information according to claim 7, wherein measuring a packet transmission time includes measuring a packet transmission time between the terminal and another terminal connected to a same sub-network;

the sent data includes the packet transmission time; and the apparatus for managing network information in which the relay devices are identified is an apparatus for creating network configuration information from the sent data by identifying a group of multiple computers connected to the same hub from the packet transmission time.

9. A method for collecting and sending network information, comprising:

measuring a packet transmission time between a terminal and another terminal among a plurality of terminals connected to a sub-network; and identifying a group of terminals connected to a hub from asset information, an identifier of each terminal, and the packet transmission time between at least one of the terminals in the group of terminals to the hub, including transmission time at the hub measured by sending packets among the plurality of terminals within the sub-network;

determining another group of terminals for which packet transmission time to the hub has not been calculated from packet transmission time between the terminals;

sending data about the identified group of terminals to an apparatus for creating a network configuration information, which includes the hub, the packet transmission time and data about the hub, and identifying segments of the network covered by the hub, and in which the hub is identified including whether or not there is the hub;

using memory on a computer processor for storing terminal serial numbers, media access control addresses of terminals, internet protocol addresses of terminals, and packet transmission times between terminals and one or more relay devices, as the network configuration information, on a disk; and identifying locations of a plurality of hubs based on packet transmission time among the another group of terminals, wherein packet transmission and measurement of packet transmission time are performed concurrently.

* * * * *